(12) United States Patent
Minear et al.

(10) Patent No.: US 8,179,393 B2
(45) Date of Patent: May 15, 2012

(54) FUSION OF A 2D ELECTRO-OPTICAL IMAGE AND 3D POINT CLOUD DATA FOR SCENE INTERPRETATION AND REGISTRATION PERFORMANCE ASSESSMENT

(75) Inventors: Kathleen Minear, Palm Bay, FL (US); Donald Pooley, Melbourne, FL (US); Anthony O'Neil Smith, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 672 days.

(21) Appl. No.: 12/371,186

(22) Filed: Feb. 13, 2009

(65) Prior Publication Data

US 2010/0207936 A1 Aug. 19, 2010

(51) Int. Cl.
*G06T 15/00* (2011.01)

(52) U.S. Cl. ........ 345/419; 345/422; 345/619; 345/642; 382/154; 382/190; 382/291; 382/294; 715/851

(58) Field of Classification Search .................. 345/419, 345/422, 619, 642; 382/154, 190, 291, 294; 715/851

See application file for complete search history.

(56) References Cited

U.S. PATENT DOCUMENTS

| | | | |
|---|---|---|---|
| 5,247,587 A | 9/1993 | Hasegawa et al. |
| 5,416,848 A | 5/1995 | Young |
| 5,781,146 A | 7/1998 | Frederick |
| 5,875,108 A | 2/1999 | Hoffberg et al. |
| 5,901,246 A | 5/1999 | Hoffberg et al. |
| 5,988,862 A | 11/1999 | Kacyra et al. |
| 6,081,750 A | 6/2000 | Hoffberg et al. |
| 6,206,691 B1 | 3/2001 | Lehmann et al. |
| 6,246,468 B1 | 6/2001 | Dimsdale |
| 6,271,860 B1 | 8/2001 | Gross |
| 6,330,523 B1 | 12/2001 | Kacyra et al. |
| 6,400,996 B1 | 6/2002 | Hoffberg et al. |
| 6,405,132 B1 | 6/2002 | Breed et al. |
| 6,418,424 B1 | 7/2002 | Hoffberg et al. |
| 6,420,698 B1 | 7/2002 | Dimsdale |
| 6,473,079 B1 | 10/2002 | Kacyra et al. |
| 6,476,803 B1 | 11/2002 | Zhang et al. |
| 6,512,518 B2 | 1/2003 | Dimsdale |

(Continued)

FOREIGN PATENT DOCUMENTS

DE 197 46 639 5/1999

(Continued)

OTHER PUBLICATIONS

Chen, et al., "Fusion of Lidar Data and Optical Imagery for Building Modeling".

(Continued)

*Primary Examiner* — Phu K Nguyen
(74) *Attorney, Agent, or Firm* — Fox Rothschild, LLP; Robert J. Sacco

(57) ABSTRACT

Method and system for combining a 2D image with a 3D point cloud for improved visualization of a common scene as well as interpretation of the success of the registration process. The resulting fused data contains the combined information from the original 3D point cloud and the information from the 2D image. The original 3D point cloud data is color coded in accordance with a color map tagging process. By fusing data from different sensors, the resulting scene has several useful attributes relating to battle space awareness, target identification, change detection within a rendered scene, and determination of registration success.

21 Claims, 8 Drawing Sheets

U.S. PATENT DOCUMENTS

| | | | |
|---|---|---|---|
| 6,512,993 | B2 | 1/2003 | Kacyra et al. |
| 6,526,352 | B1 | 2/2003 | Breed et al. |
| 6,904,163 | B1 | 6/2005 | Fujimura et al. |
| 7,015,931 | B1 | 3/2006 | Cieplinski |
| 7,046,841 | B1 | 5/2006 | Dow et al. |
| 7,098,809 | B2 | 8/2006 | Feyereisen et al. |
| 7,130,490 | B2 | 10/2006 | Elder et al. |
| 7,242,460 | B2 | 7/2007 | Hsu et al. |
| 7,477,360 | B2 * | 1/2009 | England et al. ............... 356/4.01 |
| 7,647,087 | B2 | 1/2010 | Miga et al. |
| 7,777,761 | B2 * | 8/2010 | England et al. ............... 345/619 |
| 7,831,087 | B2 | 11/2010 | Harville |
| 7,940,279 | B2 | 5/2011 | Pack |
| 7,974,461 | B2 * | 7/2011 | England et al. ............... 382/154 |
| 7,990,397 | B2 * | 8/2011 | Bukowski et al. ............. 345/642 |
| 2002/0059042 | A1 | 5/2002 | Kacyra et al. |
| 2002/0145607 | A1 | 10/2002 | Dimsdale |
| 2002/0149585 | A1 | 10/2002 | Kacyra et al. |
| 2002/0158870 | A1 | 10/2002 | Brunkhart et al. |
| 2002/0176619 | A1 | 11/2002 | Love |
| 2003/0001835 | A1 | 1/2003 | Dimsdale et al. |
| 2004/0109608 | A1 | 6/2004 | Love et al. |
| 2004/0114800 | A1 | 6/2004 | Ponomarev et al. |
| 2005/0171456 | A1 | 8/2005 | Hirschman et al. |
| 2005/0243323 | A1 | 11/2005 | Hsu et al. |
| 2006/0061566 | A1 | 3/2006 | Verma et al. |
| 2006/0244746 | A1 | 11/2006 | England et al. |
| 2007/0081718 | A1 | 4/2007 | Rubbert et al. |
| 2007/0280528 | A1 | 12/2007 | Wellington et al. |
| 2009/0097722 | A1 | 4/2009 | Dekel et al. |
| 2009/0225073 | A1 | 9/2009 | Baker, III |
| 2009/0231327 | A1 | 9/2009 | Minear et al. |
| 2009/0232355 | A1 | 9/2009 | Minear et al. |
| 2009/0232388 | A1 | 9/2009 | Minear et al. |
| 2010/0086220 | A1 | 4/2010 | Minear |
| 2010/0118053 | A1 | 5/2010 | Karp et al. |
| 2010/0207936 | A1 | 8/2010 | Minear et al. |
| 2010/0208981 | A1 | 8/2010 | Minear et al. |
| 2010/0209013 | A1 | 8/2010 | Minear et al. |
| 2011/0115812 | A1 | 5/2011 | Minear et al. |
| 2011/0200249 | A1 | 8/2011 | Minear et al. |

FOREIGN PATENT DOCUMENTS

| | | |
|---|---|---|
| EP | 1 492 054 | 12/2004 |
| EP | 1 505 547 | 2/2005 |
| JP | 05-205072 A | 8/1993 |

OTHER PUBLICATIONS

Cyr, et al., "2D-3D Registration Based on Shape Matching", Mathematical Methods in Biomedical Image Analysis, 2000.

Deng, et al. "Registration of Lidar and Optical Images Using Multiple Geometric Features", SPIE, Nov. 2007.

Huber, M., et al., "Fusion of LIDAR Data and Aerial Imagery for Automatic Reconstruction of Building Surfaces", pringed from the World Wide Web on May 19, 2009 at <http://www.sanborn.com/Pdfs/Article_Fusion_of_Lidar_Schickler.pdf>.

Liu, et al., "Automatic 3D to 2D Registration for the Photorealistic Rendering of Urban Scenes", Computer Vision and Pattern Recognition, 2005, CVPR 2005 vol. 2, pp. 137-143, vol. 2.

Schickler, W., et al., "Surface Estimation Based on Lidar", Published in: Proceeding of the ASPRS Annual Conference, St. Louis, Missouri, Apr. 2001.

Stamos, et al., "Automatic Registration of 2-D With 3-D Imagery in Urban Environments".

Williams, et al., "Simultaneous Registration of Multiple Point Sets Using Orthonormal Matrices". IEEE pp. 2199-2202.

Zollei, et al., "2D-3D Rigid Registration of X-Ray Fluoroscopy and CT Images Using Mutual Information and Sparsely Sampled Histogram Estimators", 2001 IEEE Computer Society Conference on Computer Vision and Pattern Recognition (CVPR 2001), vol. 2, p. 696.

Rahmes, et al., U.S. Appl. No. 12/268,775, filed Nov. 11, 2008, entitled "Geospatial Modeling System for Images and Related Methods".

Minear, et al., U.S. Appl. No. 12/046,862, filed Mar. 12, 2008, entitled "Registration of 3D Point Cloud Data by Creation of Filtered Density Images".

Minear, et al., U.S. Appl. No. 12/047,066, filed Mar. 12, 2008, entitled "Registration of 3D Point Cloud Data Using Eigenanalysis".

Minear, et al., U.S. Appl. No. 12/046,880, filed Mar. 12, 2008, entitled, "Method for Visualization of Point Cloud Data".

Bergman, L.D., et al., "A Rule-Based Tool for Assisting Colormap Selection" Visualization, 1995, Visualization '95. Proceedings. IEEE Conference on Atlanta, GA USA Oct. 29-Nov. 3, 1995. Los Alamitos, CA, USA, IEEE Comput. Soc. US LNKD. Oct. 29, 1995. pp. 118-125, 444.

Brenner, C., "Building Reconstruction From Images and Laser Scanning", International Journal of Applied Earth Observation and Geoinformation, Elsevier, LNKD-DOI: 10.1016/J.JAG.2004.10.006, vol. 6, No. 3-4, Mar. 1, 2005, pp. 187-198.

Gruen, A., et al., "Least Squares 3D surface and Curve Matching" ISPRS Journal of Photogrammerty and Remote Sensing, Amsterdam [U.A.] : Elsevier, vol. 59, No. 3, May 1, 2005, pp. 151-174.

Harris Corp., International Search Report mailed May 20, 2010, Application Serial No. PCT/US2010/023723.

Harris Corp., International Search Report mailed Jun. 4, 2010, Application Serial No. PCT/US2010/023738.

Matei, B.C., et al., "Building Segmentation for Densely Built Urban Regions Using Aerial LIDAR Data", Computer Vision and Pattern Recognition, 2008. CVPR 2008. IEEE Conference on, IEEE, Piscataway, NJ, USA, Jun. 23, 2008, pp. 1-8.

Kwang-Ho Bae, D. D. Lichti: "Automated Registration of Unorganised Point Clouds From Terrestrial Laser Scanners" International Archives of Photogrammetry and Remote Sensing, [Online] Jul. 12, 2004, XP002593550 Retrieved from the Internet: URL:http://www.isprs.org/proceedings/XXXV/congress/comm5/papers/553.pdf> [retrieved on Jul. 23, 2010] Section 1, Section 2 and subsections 2.1-2.4.

Bae K-H et al: "Pre-processing Procedures for Raw Point Clouds from Terrestrial Laser Scanners" Journal of Spatial Science, Spatial Sciences Institute, AU, vol. 52, No. 2, Dec. 1, 2007, pp. 65-74, XP008124682 ISSN: 1149-8596 the whole document.

Beinat et al., A direct method for the simultaneous and optimal multidimensional models registration, Nov. 8-9, 2001, IEEE/ISPRS Joint Workshop 2001 Remote Sensing and Data Fusion over Urban Areas, pp. 283-287.

Demetrios Gatziolis: "Precise FIA Plot Registration Using Fieldand Dense LIDAR Data" Proceedings of the Eighth Annual Forest Inventory and Analysis Symposium, Oct. 16, 2006, pp. 243-249, XP002593551 abstract; figures 2,3,; table 1 Sections "Introduction", "Data transcription to point patterns", "Point pattern matching".

In So Kweon et al: "High-Resolution Terrain Map From Multiple Sensor Data" IEEE Transactions on Pattern Analysis and Machine Intelligence, IEEE Service Center, Los Alamitos, CA, US LNKD-DOI:10.1109/34.121795, vol. 14, No. 2, Feb. 1, 1992, pp. 278-292, XP000248484 ISSN: 0162-8828 abstract Section III Local Terrain Matching.

Kim et al.,Lecture Notes in Computer Science 2004: An Improved ICP Algorithm Based on the Sensor Projection for Automatic 3D Registration, 2004, Springer, vol. 2972/2004, pp. 642-651.

Chen, Liant-Chien, et al., "Fusion of Lidar Data and Optical Imagery for Building" [online] Retrieved from the Internet: citeseerx.ist.psu.edu/viewdoc/download?doi=10.1.1.129...—Similar <http://www.google.com/search?hl=en&biw=987&bih=584&q=related:citeseerx.ist.psu.edu/viewdoc/download%3Fdoi%3D10.1.1.129.2409%26rep%3Drep1%26type%3Dpd+fusion+of+lidar+data+and+optical&tbo=1&sa=X&ei=mp4IToyaBpDAgQey46C-DQ&ved=0CCQQHzAA> [Jun. 25, 2011].

Harris Corp., International Search Report mailed Aug. 6, 2010, Application Serial No. PCT/US2006/035661.

Information about Related Patents and Patent Applications, see section 6 of the accompanying Information Disclosure Statement Letter, which concerns Related Patents and Patent Applications.

Wijk et al. "Enridged Contour Maps", 2001, VIS'01 Proceedings of the conference on Visualization '01, IEEE Computer Society Washington DC USA, p. 69-74.

Hengl, T. "Visualisation of uncertainty using the HSI colour model: Computations with colours." Sep. 2003, Proceedings of the 7th International Conference on GeoComputation, Southampton, United Kingdom, pp. CDROM, pp. 8-17.

Hyun "Nonlinear Color Scales for Interactive Exploration", 1991, (http://web.archive.org/web/20050921025757/http://www.caida.orghyoungh/colorscales/nonlinear.html).

Bourke "Colour Ramping for Data Visualisation", Jul. 1996 (http://web.archive.org/web/20060914040403/http://local.wasp.uwa.edu.auhpbourke/colour/colourramp).

Levkowitz et al. "Color Scales for Image Data", Jan. 1992, IEEE Computer Graphics & Applications, p. 72-80.

Nuchter, et al., 6D SLAM with an Application in Autonomous Mine Maping, Apr. 26-May 1, 2004, Proceeding of the 2004 IEEE International Conference on Robotics and Automation, vol. 2, pp. 1998-2003.

Alshawa, ICL: Iterative closest line, Dec. 2007, Ekscentar, No. 10, pp. 53-59.

Goncalvez, J.A., "Orientation of Spot Stereopairs by means of Matching a Relative DEM and the SRTM DEM", International Calibration and Orientation Workshop Eurocow 2006, Jan. 25, 2006.

Lach, S. R., et al., Multisource Data Processing for Semi-Automated Radiometrically-Correct Scene Simulation: Urban Remote Sensing Joint Event, 2007, IEEE, PI LNKD Apr. 1, 2007, pp. 1-10.

Postolov, Y., et al., "Registration of Airborne Laser Data to Surface Generated by Photogrammetric Means" International Archives of Photogrammetry and Remote Sensing, Nov. 9, 1999, pp. 95-99.

Roman, C., et al, "A Self-Consistent Bathymetric Mapping Algorithm" Journal of Field Robotics, Wiley, USA, vol. 24, No. 1-2; Jan. 2007, pp. 23-50.

Sofman, B., et al., "Terrain Classification from Aerial Data to Support Ground Vehicle Navigation" Internet Citation, Jan. 1, 2006, Retrieved from the Internet: URL:http://www.ri.cmu.edu/pub_files/pub4/sofman_boris_2006_1/sofman_boris_2006_1.pef>.

Minear, K., et al., U.S. Appl. No. 12/706,990, filed Feb. 17, 2010, entitled "Surface Detection in Images Based on Spatial Data".

Harris Corporation, International Patent Application No. PCT/US2010/023728, International Search Report mailed Aug. 4, 2010.

* cited by examiner

FUSION OF A 2D ELECTRO-OPTICAL IMAGE AND 3D POINT CLOUD DATA FOR SCENE INTERPRETATION AND REGISTRATION PERFORMANCE ASSESSMENT

BACKGROUND OF THE INVENTION

1. Statement of the Technical Field

The inventive arrangements concern registration of two-dimensional and three dimensional image data, and more particularly methods for visual interpretation of registration performance of 2D and 3D image data. This technique is used as a metric to determine registration success.

2. Description of the Related Art

Conventional electro-optical (EO) sensors have long been used for collection of such image data and generally produce two dimensional data. Such data generally corresponds to a projection of the image onto a planar field which can be entirely defined by an x and y coordinate axis. More recently, there has been a growing interest in three-dimensional imaging data. For example, LIDAR systems use a high-energy laser, optical detector, and timing circuitry to generate three-dimensional point cloud data. Each point in the 3D point cloud is spatially analogous to the pixel data generated by a digital camera, except that the 3D point cloud data is arranged in three dimensions, with points defined at various locations in a three dimensional space defined by an x, y, and z coordinate axis system. One major difference is that the lidar is range data whereas the 2D EO data has both position and intensity information. However, there is a mode whereas the lidar sensor can dwell thus creating an intensity 'image'. It should be noted that this mode is not needed to accomplish the overlapping of the two data types described in this patent for determining data alignment or registration.

Point-cloud data can be difficult to interpret because the objects or terrain features in raw data are not easily distinguishable. Instead, the raw point cloud data can appear as an almost amorphous and uninformative collection of points on a three-dimensional coordinate system. Color maps have been used to help visualize point cloud data. For example, color maps have been used to selectively vary a color of each point in a 3D point cloud as a function of the altitude coordinate of each point. In such systems, variations in color are used to signify points at different heights or altitudes above ground level. Notwithstanding the use of such conventional color maps, 3D point cloud data has remained difficult to interpret.

It is advantageous to combine 2D EO imaging data with 3D point cloud data for the same scene. This process is sometimes called data fusion. However, combining the two different sets of image data necessarily requires an image registration step to align the points spatially. Such image registration step is usually aided by metadata associated with each image. For example, such metadata can include 1) orientation and attitude information of the sensor and 2) latitude and longitude coordinates associated with the corner points of the image, and 3) in the case of point cloud data, the raw x, y, and z point locations for the point cloud data.

The 2D to 3D image registration step can be difficult and time consuming because it requires precise alignment of the EO and LIDAR data acquired by different sensors at different data collection times and different relative sensor positions. Moreover, the point cloud data is usually a different format as compared to the EO image data, making for a more complex registration problem. Various registration schemes have been proposed to solve the foregoing registration problem. However, visual interpretation of the resulting registered EO and LIDAR data often remains difficult for human analysts. One reason for such difficulty is that, even after registration and fusion of the two types of imaging data, the three-dimensional LIDAR point cloud will often appear to float above a flat two dimensional plane representing the two-dimensional image data. This creates two noteworthy problems. In particular, it makes it more difficult for a person to visualize the scene being represented by the fused image data. This occurs because it is can be difficult to comprehend how the point cloud data fits into the two-dimensional image. The same effect also makes it more difficult to evaluate how well the registration process has worked. With the three-dimensional point cloud data appearing to float above a flat two-dimensional surface, it is difficult for a human to judge how well the various features represented by the point cloud (e.g. structures, vehicles) align with corresponding features in the two-dimensional image (e.g. building outlines or footprints, and roads). Regardless, of the particular registration scheme selected, it is useful to evaluate the performance of the result.

SUMMARY OF THE INVENTION

The invention concerns a method and system for combining a 2D image with a 3D point cloud for improved visualization of a common scene as well as interpretation of the success of the registration process. The resulting fused data contains the combined information from the original 3D point cloud and the information from the 2D image. The original 3D point cloud data is color coded in accordance with a color map tagging process. By fusing data from different sensors, the resulting scene has several useful attributes relating to battle space awareness, target identification, change detection within a rendered scene, and determination of registration success.

The method for combining the 2D image with the 3D point cloud LIDAR includes several steps. If the images are not already registered, then the method can begin with a registration step in which the 2D image and 3D point cloud are aligned. Thereafter, the method involves analyzing the 2D image to identify selected content-based characteristics of a plurality of areas in the common scene. For example, the content-based characteristics can include urban scene content, natural scene content, water content, and man-made structure content. Thereafter, each of the plurality of areas which have been identified is assigned a color map tag corresponding to the content based characteristic of the area.

Following color map tag assignment using the 2D image, a different color map is assigned to each of a plurality of areas of the 3D point cloud in accordance with the color map tags. A 'range' type image is created from the 2D image. That is, a virtual 3D point cloud is formed from the 2D image by assigning a Z value to each pixel in the 2D image, where each Z value is determined based on an interpolation to closest point in the 3D LIDAR and assuming that Z value. Color values for the virtual 3D point cloud are assigned based on color values of corresponding pixels in the 2D image. Often the 2D image color information is supplied in an 11 or 16-bit value which can then be converted to an RGB value. Finally, a fused scene is created by overlaying the virtual range image and the 3D point cloud data.

The fused scene formed in this way is particularly useful for evaluating a performance or quality of the registration step. In particular, the fused scene can be visually inspected to determine if features in the common region are properly aligned.

DETAILED DESCRIPTION OF THE PREFERRED EMBODIMENTS

Figure 1:
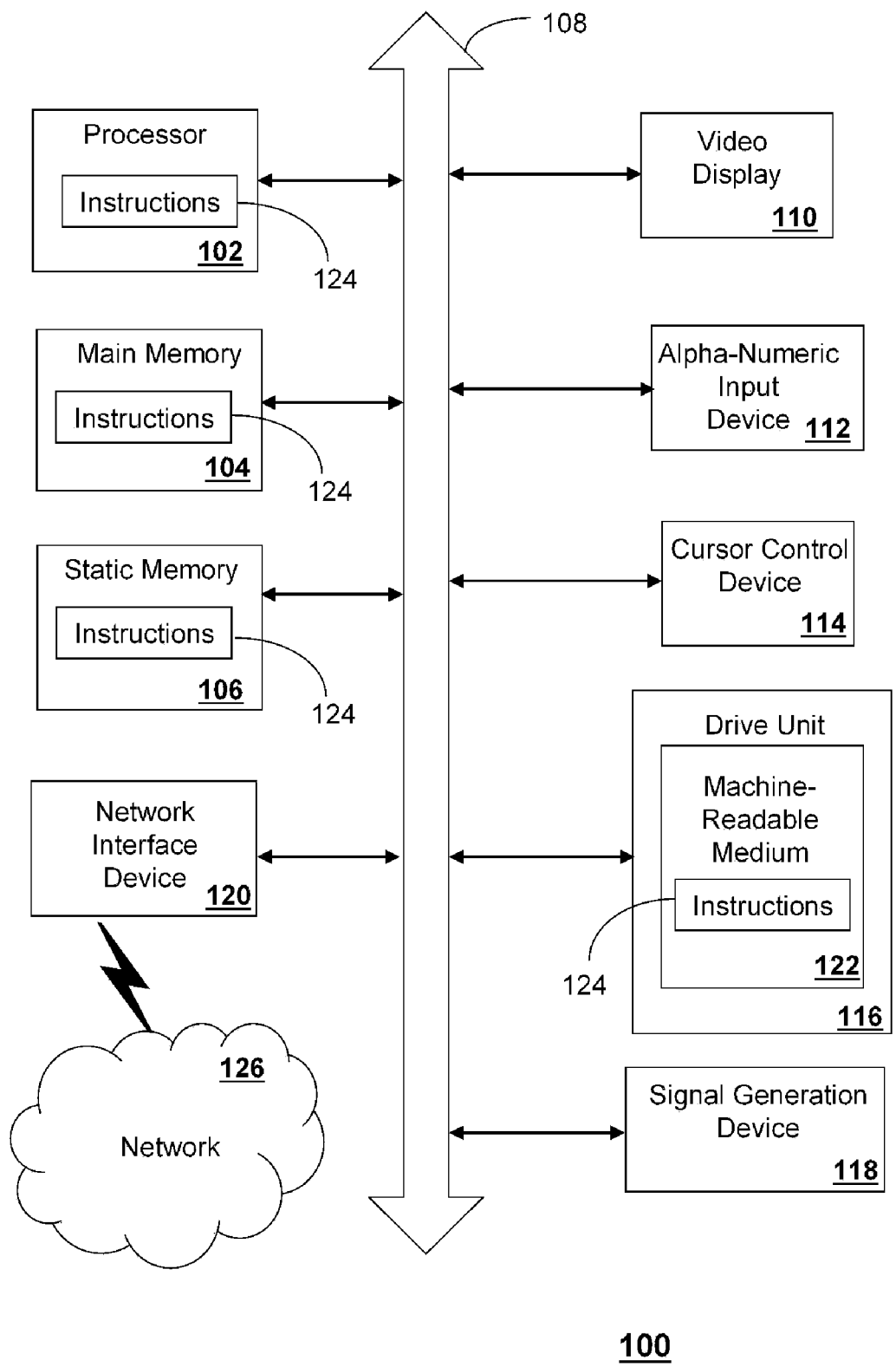
FIG. 1 is a block diagram of a computer system that is useful for understanding the invention.

In the present invention, a 2D image is modified and then fused with 3D point cloud data for a common scene. The process facilitates analysis of the scene and permits improved evaluation of the quality of the image registration process. The 2D image and 3D point cloud data are registered utilizing a suitable registration process. Thereafter, the 3D point cloud data is processed to identify and define a ground table. The ground table represents a contour of the ground in the scene. The ground table is then used to transform the 2D image into a virtual 3D image comprising a ground surface contour. The virtual 3D image is created by selectively modifying a Z value associated with the pixels of the 2D image so that they generally conform to the Z values defined by the ground table. In this way, the contours of the ground surface are imparted to the 2D image, thereby forming the virtual 3D image. Once this process is complete, the previously registered 3D point cloud data is overlaid on the virtual 3D image. The resulting fused 3D image offers improved visualization of the scene and permits better evaluation of the quality of the registration.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

The invention concerns a method for evaluating the relative performance of a registration process involving three-dimensional (3D) image data comprising a point cloud, and two-dimensional (2D) image data. For purposes of the present invention, the 2D image data and the 3D point cloud data will be assumed to have already been registered by means of some registration process. Various registration processes are known in the art. Accordingly, the particular registration process will not be described in detail.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The computer system 100 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 100 can include a processor 102 (such as a central processing unit (CPU), a graphics processing unit (GPU, or both), a main memory 104 and a static memory 106, which communicate with each other via a bus 108. The computer system 100 can further include a display unit 110, such as a video display (e.g., a liquid crystal display or LCD), a flat panel, a solid state display, or a cathode ray tube (CRT)). The computer system 100 can include an input device 112 (e.g., a keyboard), a cursor control device 114 (e.g., a mouse), a disk drive unit 116, a signal generation device 118 (e.g., a speaker or remote control) and a network interface device 120.

The disk drive unit 116 can include a computer-readable storage medium 122 on which is stored one or more sets of instructions 124 (e.g., software code) configured to implement one or more of the methodologies, procedures, or functions described herein. The instructions 124 can also reside, completely or at least partially, within the main memory 104, the static memory 106, and/or within the processor 102 during execution thereof by the computer system 100. The main memory 104 and the processor 102 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

In the various embodiments of the present invention, a computer-readable storage medium containing instructions 124 or that receives and executes instructions 124 from a propagated signal so that a device connected to a network environment 126 can send or receive voice and/or video data, and that can communicate over the network 126 using the instructions 124. The instructions 124 can further be transmitted or received over a network 126 via the network interface device 120.

While the computer-readable storage medium 122 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Figure 2A:
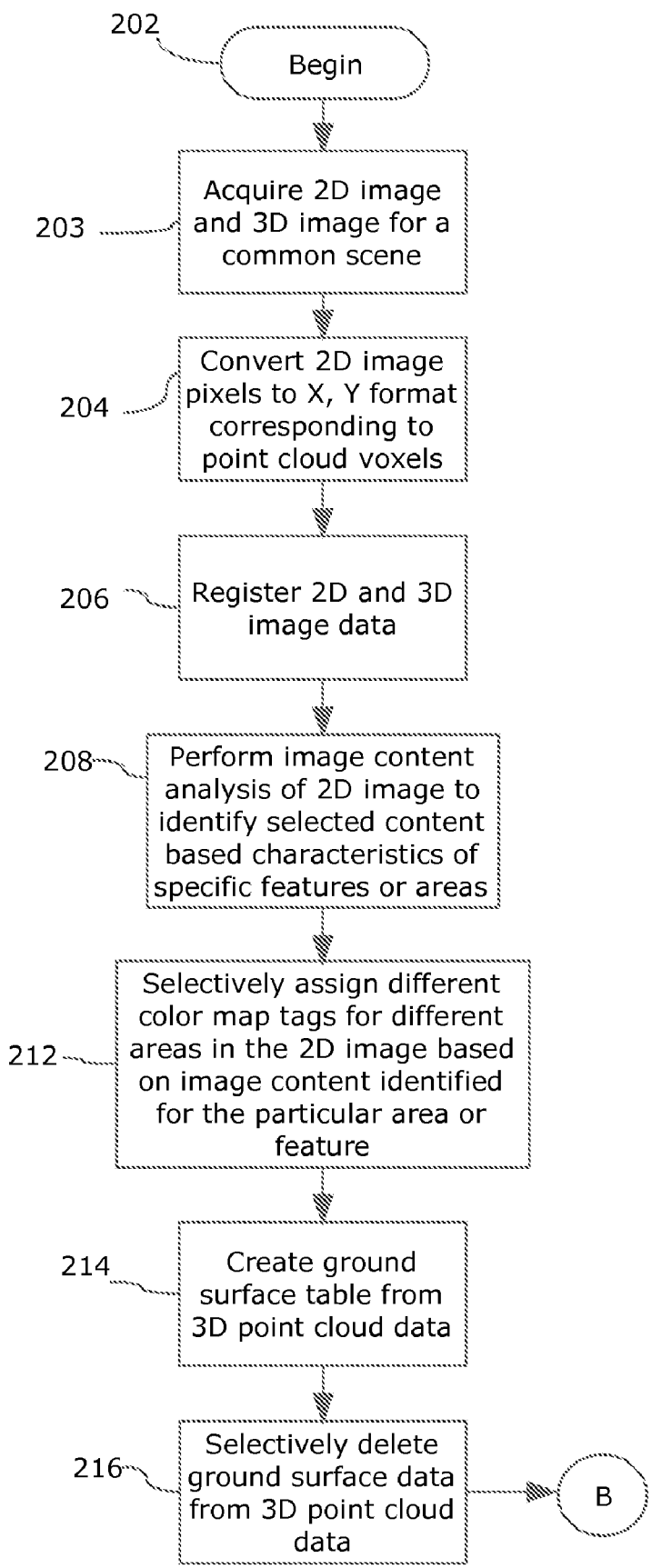
FIG. 2 is a flowchart that is useful for understanding the invention.
Figure 2B:
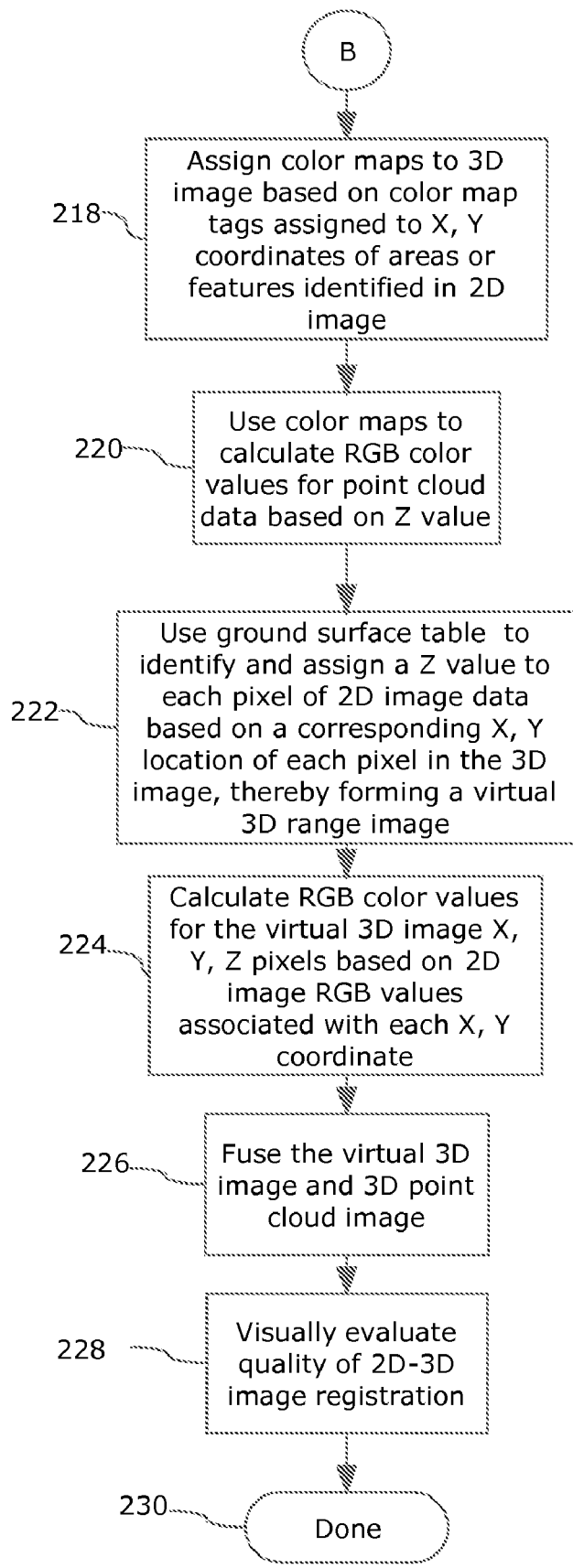

Those skilled in the art will appreciate that the computer system architecture illustrated in FIG. 1 is one possible example of a computer system. However, the invention is not limited in this regard and any other suitable computer system architecture can also be used without limitation Referring now to FIG. 2, a flowchart is provided. The flowchart is useful for understanding a process used for evaluating the relative performance of a registration process involving three-dimensional (3D) image data comprising a point cloud, and two-dimensional (2D) image data. The method begins in step 202 and continues in step 203 with the acquisition of 2D image data and 3D image data for a common scene.

Figure 3:
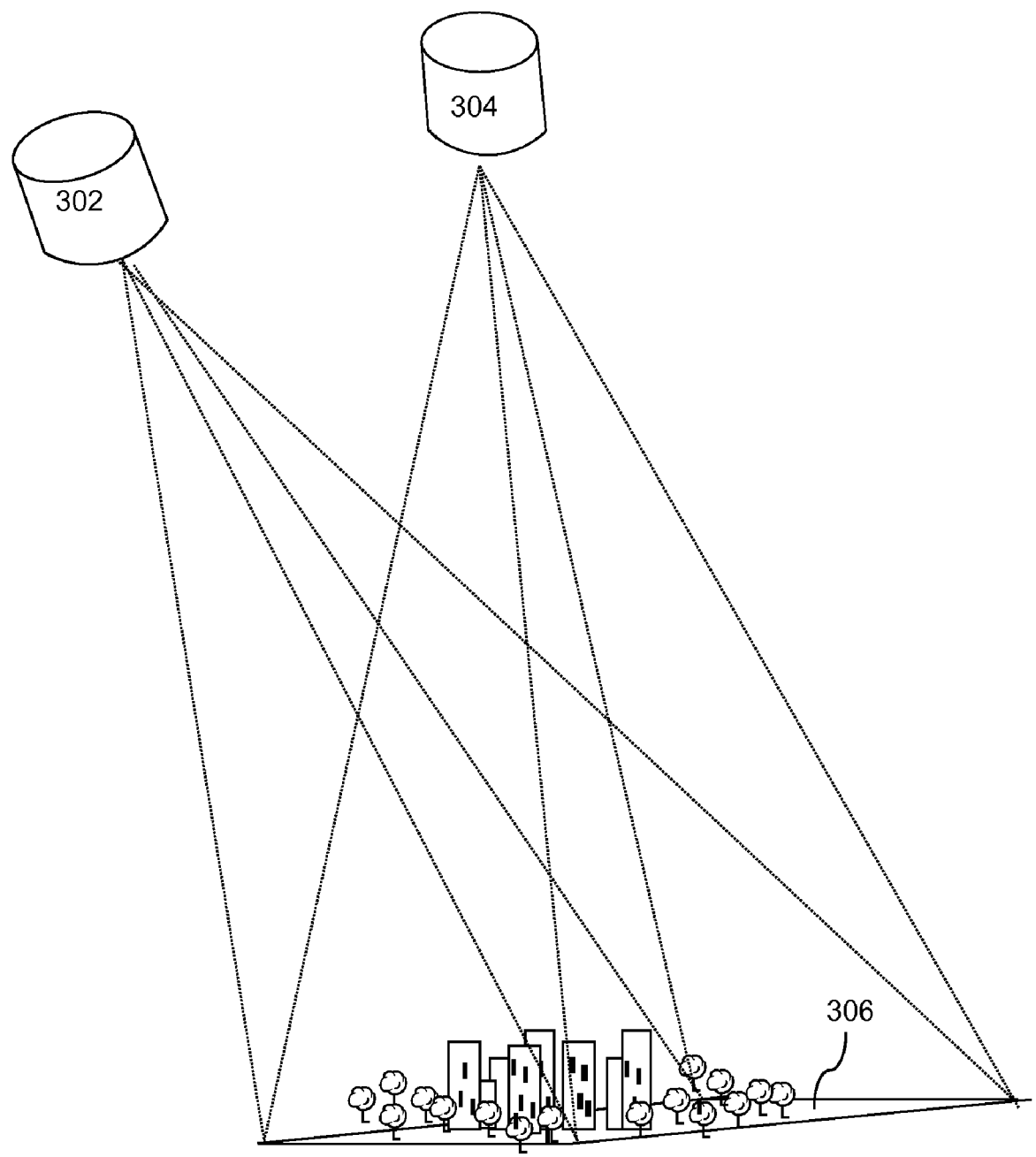
FIG. 3 is diagram that is useful for understanding how image data is acquired from different vantage points.

As shown in FIG. 3, a first and second imaging sensor 302, 304 each acquire image data of a common scene 306. Although two imaging sensors are shown in FIG. 3, it should be understood that the invention is not so limited. Instead, a common sensor can be used at two different times. Significantly, in FIG. 3, first satellite 302 can be configured to collect 2D image data and second sensor 304 can be configured to collect 3D point cloud image data.

Advantageously, the two-dimensional image data acquired is multi-spectral imagery that can be presented in color. However, the invention could be used with panchromatic imagery as well. The two dimensional image data as described herein can be collected by any suitable imaging sensor as would be known to one of ordinary skill in the art. For example, earth-orbiting satellites and airborne data collection platforms commonly collect the 2D image data using electro-optical (EO) sensors. The term "electro-optical sensor" as used herein generally refers to any one of a wide variety of devices in which an optical system is used for imaging radiation from a scene onto the image sensing surface of an imaging device for a selected sample period. The imaging device may take the form of a two dimensional array of photo-responsive areas. A variety of semiconductor based imaging devices are known in the art. For example, charge coupled devices (CCDs) and photodiode arrays are often used for this purpose, without limitation. Still, it should be understood that the foregoing imaging devices are identified merely by way of example, and the invention is not intended to be limited to any particular EO type imaging device. For example, the invention can also be used for registration of medical images.

A variety of different types of imaging sensors can be used to generate 3D data, and more particularly, 3D point cloud data. The present invention can be utilized for evaluating registration performance of 3D point cloud data obtained from any of these various types of imaging systems. One example of a 3D imaging system that generates one or more frames of 3D point cloud data is a conventional LIDAR imaging system. Each frame of LIDAR data will be comprised of a collection of points in three dimensions (3D point cloud) which correspond to the multiple range echoes. These points can be organized into "voxels" which represent a value on a regular grid in a three dimensional space. Voxels used in 3D imaging are analogous to pixels used to in the context of 2D imaging devices. These frames can be processed to reconstruct a 3D image of a target. In this regard, it should be understood that each point in the 3D point cloud has an individual x, y and z value, representing the actual surface within the scene in 3D.

Figure 5:
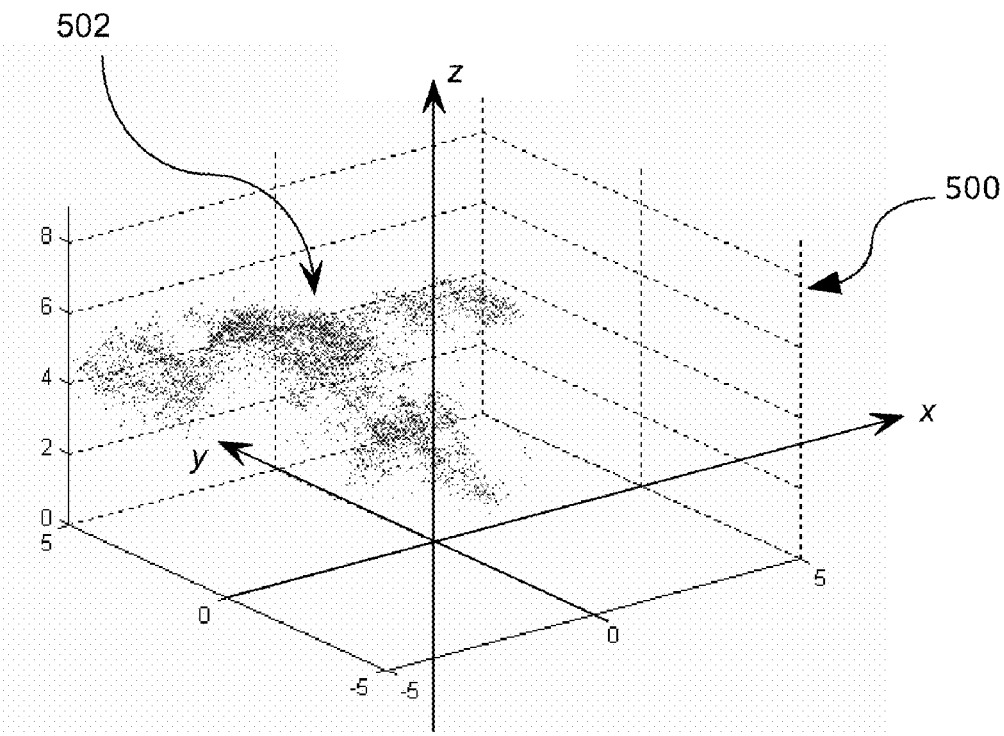
FIG. 5 is a drawing which is useful for understanding three-dimensional image data or point cloud data.
Figure 6:
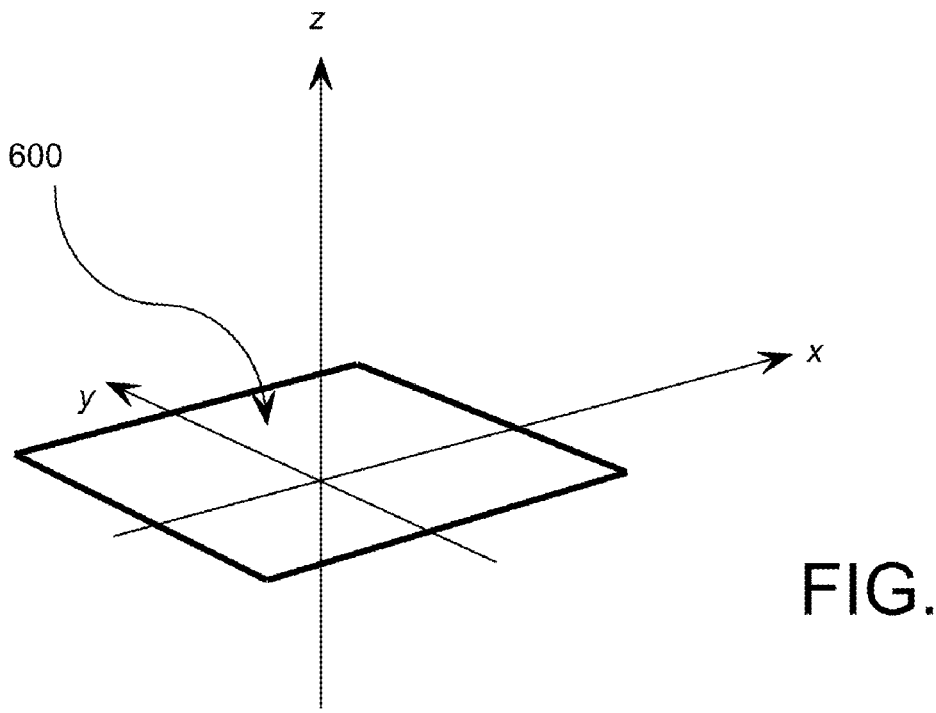
FIG. 6 is a drawing that is useful for understanding two-dimensional image data.

An exemplary cube 500 of 3D data is shown in FIG. 5, whereas a frame of 2D image data is shown in FIG. 6. Note that the frame of 2D image data 600 is defined in a single x, y plane whereas the cube 500 of 3D image data comprises a point cloud 502 which is defined in three dimensions (x, y, z). Further, it should be noted that although the exemplary 3D image data in FIG. 5 is shown to be delimited as a cube, the invention is not limited in this regard. Although it will be appreciated that a cube can be a convenient shape to use for this purpose, the 3D data can be defined within any other suitable geometric volume. For example, in place of a cube, a rectangular prism can also be used to delimit a set of 3D point cloud data. Notwithstanding the foregoing, for purposes of convenience, the invention will be described in the context of a cube of point cloud data.

Referring once again to FIG. 3, it will be appreciated that the imaging sensors(s) 302, 304, can have respectively different locations and orientation. Those skilled in the art will appreciate that the location and orientation of the sensors is sometimes referred to as the pose of such sensors. For example, the sensor 302 can be said to have a pose that is defined by pose parameters at the moment that the 3D image data is acquired.

From the foregoing, it will be understood that the 2D image and 3D point data that is acquired by sensors 302, 304 will generally be based on different sensor-centered coordinate systems. Consequently, the 2D image and 3D point data will be defined with respect to different coordinate systems. Those skilled in the art will appreciate that these different coordinate systems must be rotated and translated in space as needed before the 2D image and 3D point data from the two or more image sensors can be properly represented in a common coordinate system. The foregoing process is commonly referred to as registration.

In step 204, the pixels comprising the 2D image are converted to an X, Y format common to the 3D point data. As will be appreciated by those skilled in the art, the 3D point cloud data is commonly represented in terms of latitude, longitude (X, Y) coordinates in addition to an altitude Z coordinate. In contrast, the 2D image pixel data will typically be in a different format. In step 204, the 2D image is converted to an X, Y format that is consistent with the format associated with the point cloud data comprising the 3D image.

In step 206, the 2D image data and the 3D data are registered by means of some registration process capable of registering 2D images and 3D point clouds. Any suitable algorithm or registration process can be used for this purpose as would be known to one skilled in the art. Since the present invention does not directly concern the method by which the registration process is performed, such registration process will not be described here in detail. The result of the registration process will be a 2D image data and a 3D point cloud data for a common scene which are substantially registered in accordance with some registration scheme.

Figure 4:
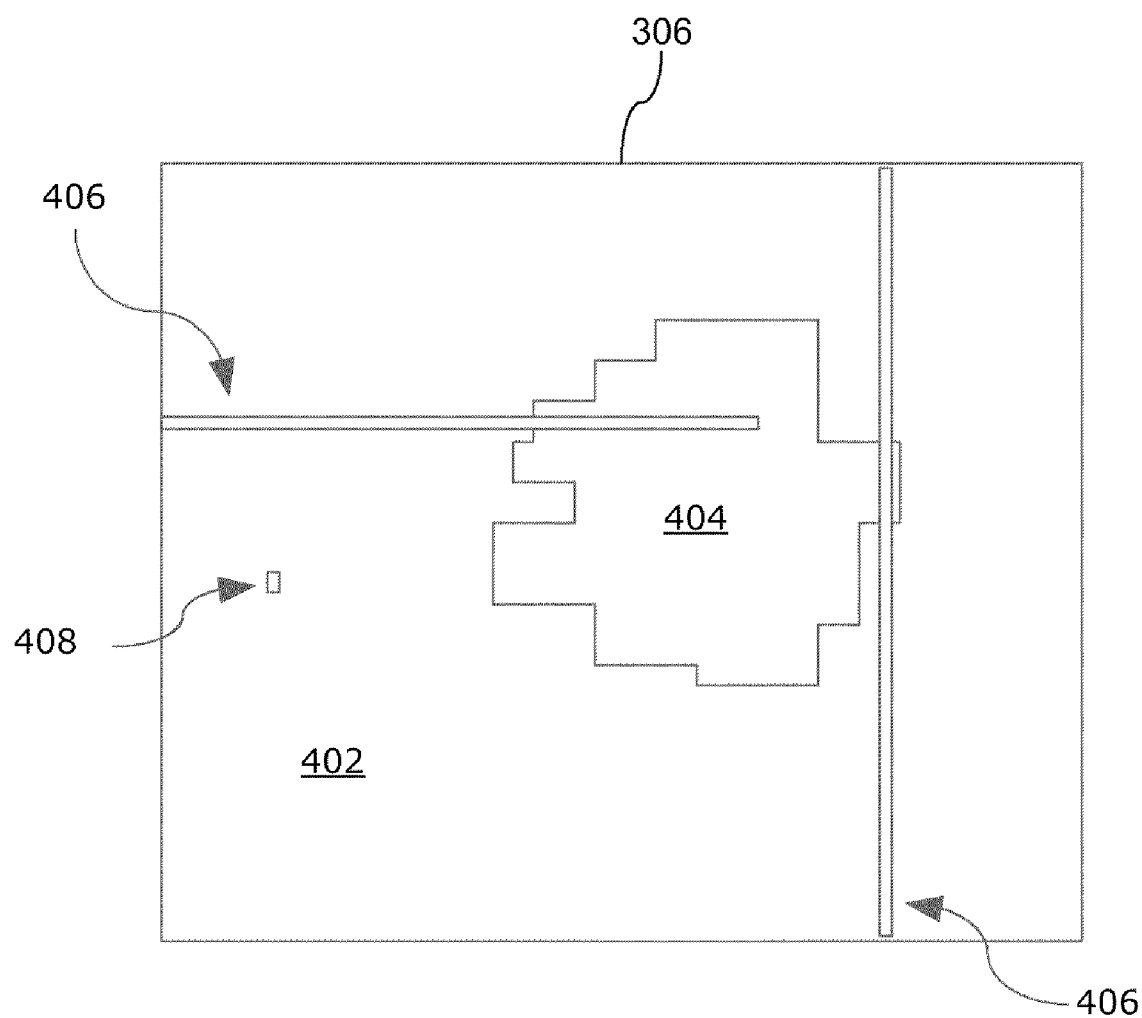
FIG. 4 is a conceptual drawing which is useful for understanding how color map tags can be assigned to a 2D image.

The process continues in step 208 by performing image content analysis of the 2D image. The image content analysis is a statistical analysis chosen or configured to identify characteristics of specific features or areas contained within the 2D image. This analysis can be thought of as a feature extraction step. For example, using conventional scene content detection algorithms, the scene can be separated into urban areas and natural areas. As shown in FIG. 4, the urban areas 404 can be those areas in the 2D image that are identified as containing numerous buildings and other man-made structures. Since buildings and other man-made structures commonly include many linear edges and corners, such structures can be easily recognized by employing various edge and corner detection algorithms as would be known to one skilled in the art. Natural areas 402 can be identified as those areas other than urban areas. Still, the invention is not limited in this regard, and various other types of image recognition algorithms can be employed to recognize urban, natural or other types of regions. For example, other types of areas can include rocky or desert areas, highly wooded areas, agricultural areas, water areas, and so on.

Alternatively, or in addition to merely identifying broad regions or areas as being urban versus natural, the scene content detection algorithms can detect specific individual features contained within a scene. For example, scene content detection algorithms can identify roads 406 which are present in the 2D image. The scene content detection algorithms can also be used to identify individual buildings 408 or other types of structures without limitation. For example, vehicles can also be identified. Algorithms for performing these functions are known in the art and therefore will not be described here in detail.

After image content detection analysis is complete, the process continues on to step 212. In step 212, different color map tags are assigned for selected X, Y coordinate areas of the 2D image. Different color map tags are assigned for different areas or features 402, 404, 406, 408 which have been identified. For example a first type of color map tag can be assigned to any area 404 identified as urban, whereas a second color map tag can be assigned to any area 402 that is designated as natural. Further, different color map tags can be associated with the X, Y coordinates of specific features such as individual buildings 408, or roads 406, which have been identified within an image 306.

According to one embodiment of the invention, each individual color map tag is associated with a particular color map. Moreover, each color map is advantageously chosen to help visualize features associated with particular types of scenes or scene content. For example, one such color map is described in commonly owned U.S. patent application Ser. No. 12/046,880 to Minear, et al., the content of which application is expressly incorporated herein by reference. As described therein in more detail, color maps can be designed to enhance certain types of subject matter in a scene by selectively choosing hue saturation, and intensity to highlight features at different altitudes. These colormaps created in this HSI space can be nonlinear allowing intensity highlights in regions of interest such as under a tree canopy as well as above the tree line. More particularly, color maps can be selected so that values defined for color saturation and intensity have a peak value at one or more predetermined altitudes. For example, a peak value can be provided at altitudes approximately corresponding to an upper height limit of a predetermined feature height range. Color maps can also be selected which mimic colors that are normally associated with certain types of scene content, such as buildings, vegetation, or roads.

In step 214 a ground surface table is created using the 3D point cloud. The ground surface table can be thought of as a representation (in table form) of the ground surface contour of the scene contained in the 3D point cloud. It is based on a uniform grid of the 3D point cloud, and defined with respect to the X, Y, and Z coordinate axis. The ground surface table defines a Z value representing an approximated altitude for each gridded region of the scene.

In order to understand how the ground surface table is created, it is useful to first consider the nature of 3D point cloud data. Systems used to acquire 3D point cloud data (e.g. LIDAR) are generally configured to measure "last-return" data points. Such "last-return" points are often the result of reflected energy associated with ground data noise. Thus, rather than representing a true map of the underlying terrain, the Z values associated with each X, Y point in the raw 3D point cloud data will also correspond to various other object such as vegetation, vehicles, and structures. In order to determine a set of points corresponding to a terrain or ground surface, at least some post processing is usually required to exclude extraneous features such as vehicles, structures and vegetation which do not actually correspond to contours in terrain. A variety of algorithms are known in the art for extracting or estimating such ground surface altitude based on the 3D point cloud data. Any such algorithm can be used to generate a ground surface table.

Once the ground surface table has been generated in step 214, the process continues on to step 216. In step 216, data points are selectively deleted from the raw 3D point cloud. In effect, the 3D point cloud data is reduced by removing the points associated with a ground surface or terrain. According to an embodiment of the invention, for each subregion in the 3D lidar data, this can be accomplished by deleting any point within that subregion that does not exceed the Z value (plus a small delta Z) specified in the ground surface table for that subregion For example, the Z value for a particular subregion might be one meter. In that case, for each point in the raw point cloud data that lies within that subregion, a determination can be made as to whether the altitude or Z value of the raw data point is less than 1 meter plus a small delta in height. If so, then the point is deleted; otherwise the point is retained. Still, it should be understood that any other technique can be used to selectively delete ground surface data points from the raw point cloud data. Regardless of the technique that is applied, the goal in this step is to eliminate all points within the point cloud data which are below some Z-value which is just above ground surface level. This is done to eliminate ground noise, which is generally not useful for purposes of evaluating performance of image registration processes.

Following step 216, the method continues on to step 218. Although color map tags are assigned in step 212 for certain X, Y areas contained in the 2D image, the color maps are not actually used for assigning colors to pixels associated with the 2D image. Instead, the color maps are used in step 218 for assigning colors to points in the corresponding X, Y areas of the 3D point cloud data. Since the 2D image and 3D point cloud are registered, areas and features in a particular scene will have approximately the same X, Y coordinate areas in each image data set. For example, a particular urban area in the 2D scene having defined X, Y coordinate area will correspond to the approximately the same X, Y coordinate area in the 3D point cloud data. This will also be true with respect to various other features in the scene, such as individual buildings and roads. In effect then, suitable color maps for different portions of a scene are identified using the 2D image, and the color maps are applied in step 218 to the data points contained in corresponding areas of the 3D point cloud.

In step 220, the assigned color maps are used to calculate or otherwise determine an RGB color value for each data point in the 3D point cloud. The color maps are a function of the Z coordinate, so that the actual color of each point in the 3D point cloud will be based on (1) the particular color map assigned to an X, Y area of the 3D image, and (2) based on the Z value or relative height of that particular point. The relative height can be measured with respect to the ground surface.

Those skilled in the art will appreciate that a color map as referred to herein as a table, schedule or mathematical equation which can be used to determine which specific RGB color values should be assigned to points having particular Z values. Any suitable color map can be used for this purpose. However, it can be advantageous to choose a color map that has some visualization benefit for an observer. For example, it can be advantageous to use color maps designed to enhance certain types of subject matter in a scene by selectively choosing hue and intensity to highlight features at different altitudes. It can also be advantageous to choose color maps that use particular hues that are commonly understood as corresponding to particular scenes. For example, brown, tan and green colors may be used for natural areas as they naturally correspond to the color of vegetation. In contrast, various grey hues can be more consistent with a human user's understanding of an urban area.

Figure 7:
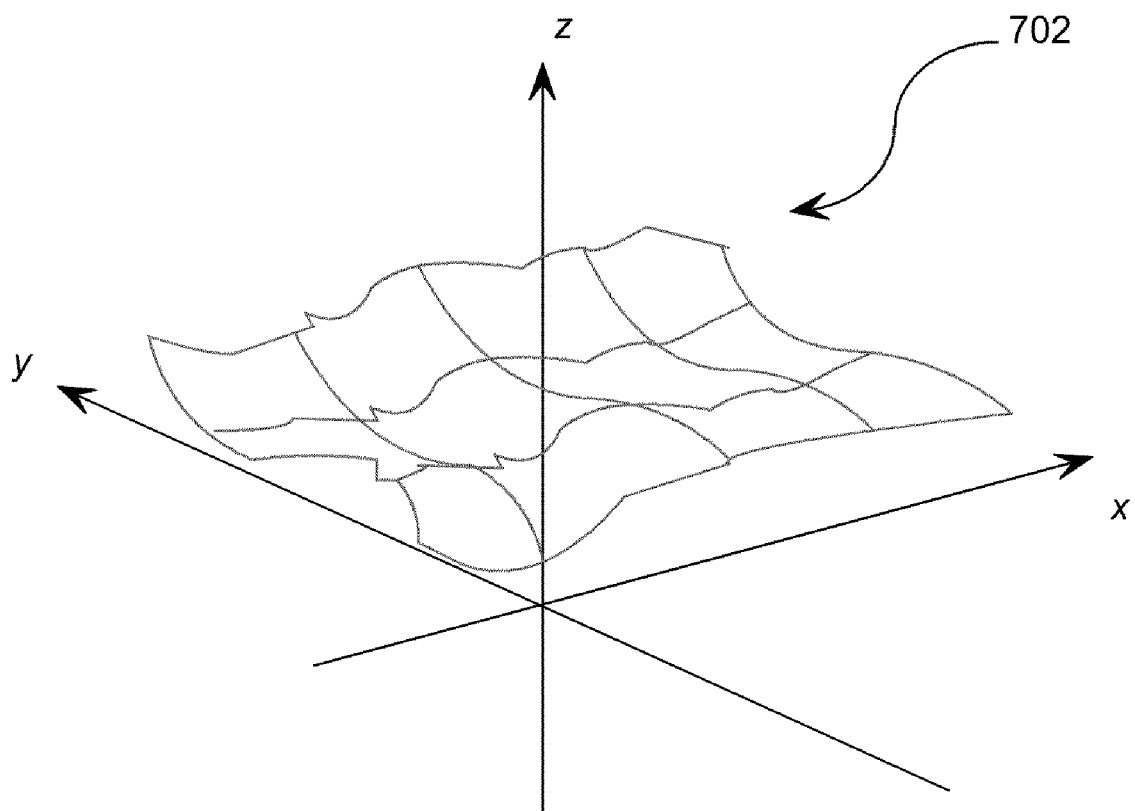
FIG. 7 is drawing which is useful for understanding how two-dimensional image data in FIG. 6 is converted to a virtual three-dimensional image.

In step 222 the ground surface table derived from the 3D image data in step 214 is used to assign a Z value to each pixel of the 2D image data. The Z value is determined by interpolating the Z value in the region of the ground surface table. Once a suitable Z value has been calculated from the ground surface table, that Z value is assigned as a Z value for the pixel in the 2D image. The result is a virtual 3D point cloud based on the 2D image pixels. This is conceptually illustrated in FIG. 7 which shows the contours of virtual 3D image 702 after the Z values from the ground surface table have been assigned to the 2D image data. In FIG. 7, the 2D EO image has been converted to a virtual 3D range image.

The method continues in step 224 by calculating RGB color values for each point in the virtual 3D range image obtained in step 222. The RGB color values for the virtual 3D image is based any suitable color map. A good choice for the virtual 3D range image color map is one that has minimal variation of hues so as to not be distracting to the final fused product. More particularly, each virtual 3D point will now have an X, Y, and Z coordinate as well as a color value.

In step 226, the method continues with the step of fusing the 3D point cloud data with the virtual 3D image created from the 2D EO image. The fusion process combines the relevant information from the original 3D point cloud and the virtual 3D point cloud. This is a true fusion since it involves combining different sources of information into one scene in order to obtain addition information about that environment for visually interpretation and scene awareness.

The resulting fused scene following step 226 will be a 3D scene which contains the combined information from the original LIDAR point cloud data and the information from the 2D image. The original 3D point cloud data will be color coded in accordance with the color map tagging process. The resulting 3D scene has several useful attributes relating to battle space awareness, target identification, change detection within a rendered scene, and determination of registration success. Each of these features shall hereinafter be discussed in more detail.

Figure 8:
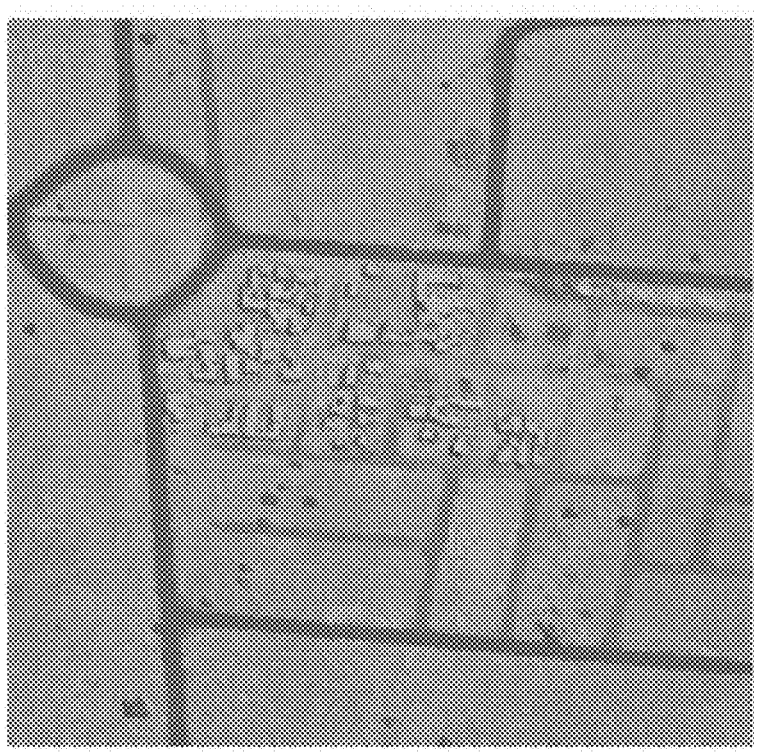
FIG. 8 is an example of two-dimensional image data that can be used in the process described in FIG. 2.
Figure 9:
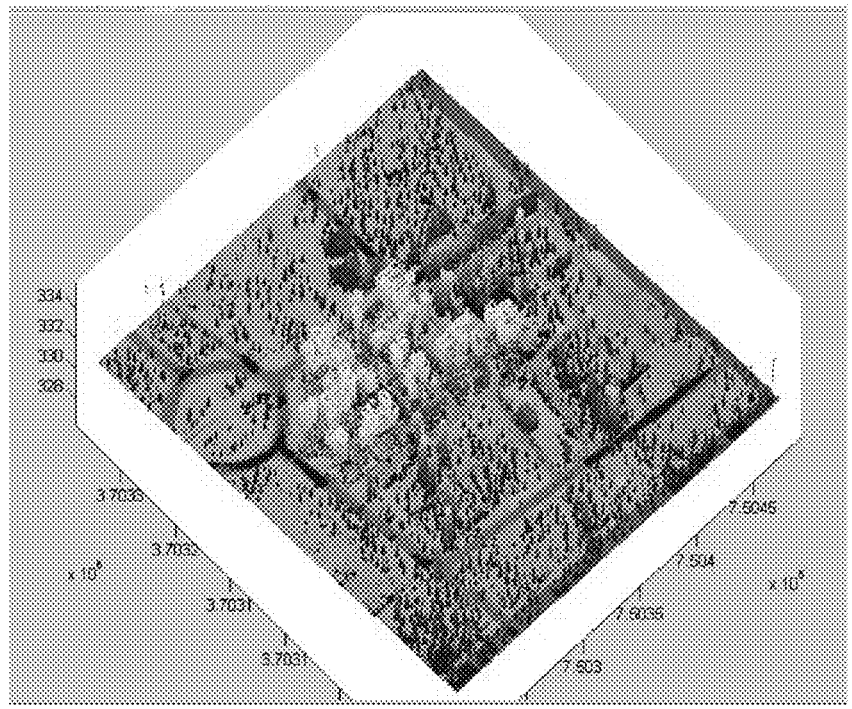
FIG. 9 is an example of a fused image in which a virtual 3D image is combined with 3D point cloud data.

Referring now to FIG. 8, there is shown an example of a 2D image that can be used to form a virtual 3D image similar to the one illustrated in FIG. 7. FIG. 9 shows a fused image in which the 2D image in FIG. 8 has been first converted to a virtual 3D image as in FIG. 7, and then fused with 3D point cloud data in accordance with the various steps set forth in FIG. 2. The image in FIG. 9 can be rotated, enlarged and viewed in three dimensions on a computer screen to aid a user in visualizing a scene, and evaluating the performance of a registration process.

In the field of scene interpretation such as for battle-space awareness the fused scene in FIG. 9 makes visualization cleaner and more natural to the human eye. The point cloud data no longer appears to float above a flat two-dimensional image. Instead, the 2D image is transformed to a virtual 3D image that corresponds to the actual ground surface contour of the scene. In the resulting fused image, the ground contour will provide improved context and meaning to the 3D point cloud data. The color models that are defined and then mapped to the 3D points are advantageously selected so that they closely relate to real world colors of corresponding areas and features. This gives familiarity to the user when visualizing the data. In the field of target identification, targets within the fused image can be extracted and correlated with a database of known targets. In the field of change detection, fused scenes which are separated by time can be overlayed and compared for object differences and vehicle movement.

In addition, the resulting fused scene is more useful for determining whether the registration process has been successful. One of the challenges encountered when attempting to register 3D point cloud data with 2D image data is determining whether the registration process correctly registered the two sets of data. The process described with respect to FIGS. 1-7 permits a person to visually evaluate the quality of the registration. In the resulting fused image, the ground contour of the virtual 3D image juxtaposed with the actual 3D point cloud data will provide improved context and meaning to the 3D point cloud data. This offers a better opportunity for a human to evaluate whether the registration process has produced a fused image in which objects represented by the 3D point cloud data appear to be properly positioned relative to the 2D image data. Also, by color coding the points in the 3D point cloud, a clear visual interpretation is made possible with respect to the proper alignment of features in the scene. For example, a visual evaluation can be made with regard to alignment of building corners, vehicles, roads, and so on. This visual evaluation process would be significantly more difficult or impossible without such color coding.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method performed by a computing device for combining a 2D image with a 3D image for improved visualization of a common scene, comprising:
    analyzing said 2D image to identify selected content based characteristics of a plurality of first areas in said common scene;
    selectively assigning to each area of said plurality of first areas a different color map tag of a plurality of color map tags that corresponds to a content based characteristic of said area, each of said plurality of color map tags identifying a different one of a plurality of color maps;
    using said plurality of color map tags to assign a different color map of said plurality of color maps to each of a plurality of second areas of said 3D image which correspond to said plurality of first areas of said 2D image;
    respectively applying said plurality of color maps to data defining said plurality of second areas of said 3D image;
    forming a virtual 3D image from said 2D image by assigning a Z value to pixels in said 2D image based on a contour of a surface defined by first points of said 3D image;
    determining color values for second points in the virtual 3D image based on a desired color map; and
    creating a fused image by overlaying said 3D image and said virtual 3D image.

2. The method according to claim 1, further comprising evaluating a performance or quality of a registration process by visually inspecting said fused image to determine if features in said common scene are properly aligned.

3. The method according to claim 1, wherein said content based characteristics are selected from the group consisting of urban content, natural content, water content, and man-made structure content.

4. The method according to claim 3, wherein said man-made structure content is selected from the group consisting of buildings, houses, roadways, and vehicles.

5. The method according to claim 1, wherein said 3D image is comprised of a plurality of points comprising a 3D point cloud where each point is defined in accordance with an X, Y, and Z coordinate axis value, and said 2D image is comprised of a plurality of pixels having a position defined exclusively in accordance with said X and Y coordinate axis values.

6. The method according to claim 5, further comprising assigning each of said plurality of color maps to one or more points having X, Y, and Z coordinate values within areas in said 3D image based on said plurality of color map tags assigned to corresponding ones of said X, Y coordinate values of said plurality of areas identified in said 2D image.

7. The method according to claim 1, further comprising removing a portion of said 3D image comprising data defining said surface prior to creating said fused image.

8. The method according to claim 5, wherein said values are assigned by:
    assigning to at least a first one of said plurality of pixels of said 2D image a first Z value of a corresponding one of said first points of said 3D image that has an X coordinate value and a Y coordinate value that is the same thereof; and
    interpolating or estimating a second Z value for at least a second one of said plurality of pixels of said 2D image if none of said first points in said 3D image has the same X coordinate value and Y coordinate value as said one of said plurality of pixels.

9. The method according to claim 1, wherein at least one color map of said plurality of color maps is selected to mimic colors or hues that are commonly associated with said content based characteristic of the area for which the color map is used.

10. The method according to claim 1, further comprising registering said 2D image and said 3D image.

11. A system for combining a 2D image with a 3D image for improved visualization of a common scene, comprising:
    a computer programmed with a set of instructions for
        analyzing said 2D image to identify selected content based characteristics of a plurality of first areas in said common scene;
        selectively assigning to each area of said plurality of first areas a different color map tag of a plurality of color map tags that corresponds to a content based characteristic of said area, each of said plurality of color map tags identifying a different one of a plurality of color maps;
        using said plurality of color map tags to assign a different color map of said plurality of color maps to each of a plurality of second areas of said 3D image which correspond to said plurality of first areas of said 2D image;
        respectively applying said plurality of color maps to data defining said plurality of second areas of said 3D image;
        forming a virtual 3D image from said 2D image by assigning a Z value to pixels in said 2D image, each said Z value determined based on a contour of a surface defined by first points of said 3D image;
        determining color values for second point in the virtual 3D image based on a desired color map on a color values of a corresponding pixel in said 2D image; and
        creating a fused image by overlaying said 3D image and said virtual 3D image.

12. The system according to claim 11, further comprising evaluating a performance or quality of a registration process by visually inspecting said fused image to determine if features in said common scene are properly aligned.

13. The system according to claim 11, wherein said content based characteristics are selected from the group consisting of urban content, natural content, water content, and man-made structure content.

14. The system according to claim 13, wherein said manmade structure content is selected from the group consisting of buildings, houses, roadways, and vehicles.

15. The system according to claim 11, wherein said 3D image is comprised of a plurality of points comprising a 3D point cloud where each point is defined in accordance with an X, Y, and Z coordinate axis value, and said 2D image is comprised of a plurality of pixels having a position defined exclusively in accordance with X and Y coordinate axis values.

16. The system according to claim 15, wherein said computer is programmed to assign each of said plurality of color maps to one or more points having X, Y, and Z coordinate values within areas in said 3D image based on said plurality of color map tags assigned to corresponding ones of said X, Y coordinate values of said plurality of areas identified in said 2D image.

17. The system according to claim 11, wherein said computer is programmed to remove a portion of said 3D image comprising data defining said surface prior to creating said fused image.

18. The system according to claim 15, wherein said Z values are assigned by:
   assigning to at least a first one of said plurality of pixels of said 2D image a first Z value of a corresponding one of said first points of said 3D image that has an X coordinate value and a Y coordinate value that is the same thereof; and
   interpolating or estimating a second Z value for at least a second one of said plurality of pixels of said 2D image if none of said first data points in said 3D image has the same X coordinate value and Y coordinate value as said one of said plurality of 2D pixels.

19. The system according to claim 11, wherein at least one color map of said plurality of color maps mimics colors or hues that are commonly associated with said content based characteristic of the area for which the color map is used.

20. The system according to claim 11, wherein said computer is programmed to register said 2D image and said 3D image.

21. A method performed by a computing device for combining a 2D image with a 3D image for improved visualization of a common scene, comprising:
   analyzing said 2D image to identify selected content based characteristics of a plurality of first areas in said common scene;
   selectively assigning to each area of said plurality of first areas a different color map tag of a plurality of color map tags that correspond to a content based characteristic of said area, each of said plurality of color map tags identifying a different one of a plurality of color maps;
   registering a 2D image with a 3D image;
   using said plurality of color map tags to assign a different color map of said plurality of color maps to each of a plurality of second areas of said 3D image which correspond to said plurality of first areas of said 2D image;
   respectively applying said plurality of color maps to data defining said plurality of second areas of said 3D image;
   forming a virtual 3D image from said 2D image by assigning a Z value to pixels in said 2D image based on a contour of a surface defined by first points of said 3D image; and
   creating a fused image by overlaying said 3D image and said virtual 3D image in accordance with said registration.

\* \* \* \* \*